US011287718B2

(12) United States Patent
Harris et al.

(10) Patent No.: US 11,287,718 B2
(45) Date of Patent: Mar. 29, 2022

(54) REUSABLE DISPLAY ADDRESSABLE WITH INCIDENT LIGHT

(71) Applicant: E INK CORPORATION, Billerica, MA (US)

(72) Inventors: George G. Harris, Woburn, MA (US); Richard J. Paolini, Jr., Framingham, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/564,036

(22) Filed: Sep. 9, 2019

(65) Prior Publication Data
US 2020/0004098 A1   Jan. 2, 2020

Related U.S. Application Data

(62) Division of application No. 15/223,697, filed on Jul. 29, 2016, now abandoned.
(Continued)

(51) Int. Cl.
G02F 1/167 (2019.01)
G02F 1/1335 (2006.01)
(Continued)

(52) U.S. Cl.
CPC .............. G02F 1/167 (2013.01); G02B 1/14 (2015.01); G02B 5/201 (2013.01); G02F 1/1336 (2013.01);
(Continued)

(58) Field of Classification Search
CPC ........ G02F 1/161; G02F 1/1533; G02F 1/157; G02F 1/163; G02F 1/155; G02F 1/0018; G02F 1/153; G02F 1/133514; G02F 1/1339; G02F 1/0126; G02F 1/0102; G02F 1/133555; G02F 1/1516; G02F 1/15165; G02F 2201/086; G02F 2201/34; G02F 2202/14; G02F 1/167; G02F 1/0107; G02F 1/1309; G02F 1/133345; G02F 1/13338; G02F 1/13394; G02F 1/134309; G02F 1/134363; G02F 1/13439; G02F 1/136213; G02F 1/136286; G02F 1/1368; G02F 1/15; G02B 5/0808; G02B 5/208; G02B 5/23; G02B 5/201; G02B 1/14
(Continued)

(56) References Cited

U.S. PATENT DOCUMENTS 4,418,346 A   11/1983 Batchelder
4,786,939 A   11/1988 Haneda
(Continued)

OTHER PUBLICATIONS

Wood, D., "An Electrochromic Renaissance?" Information Display, 18(3), 24 (Mar. 2002).
(Continued)

Primary Examiner — Brandi N Thomas
(74) Attorney, Agent, or Firm — Brian D. Bean

(57) ABSTRACT

A reflective color display that can be addressed from the front (viewing surface side) of the display with a light source, such as a projector, LED, or laser. The display comprises (in order) a color filter array, a transparent electrode, an electro-optic medium, a photoconductive material, and a rear electrode. The color displays of the invention are useful for large format color signage, such as billboards and wayfinding.

15 Claims, 7 Drawing Sheets

Related U.S. Application Data

(60) Provisional application No. 62/200,739, filed on Aug. 4, 2015.

(51) Int. Cl.
  *G02F 1/133* (2006.01)
  *G02B 5/20* (2006.01)
  *G02F 1/13357* (2006.01)
  *G02B 1/14* (2015.01)
  *G02F 1/1676* (2019.01)

(52) U.S. Cl.
  CPC .... *G02F 1/13318* (2013.01); *G02F 1/133514* (2013.01); *G02F 1/1676* (2019.01); *G02F 2202/12* (2013.01)

(58) Field of Classification Search
  USPC ............ 359/237, 242, 265–267, 270–273, 359/290–292, 295, 296, 298
  See application file for complete search history.

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,664,944 B1 | 12/2003 | Albert et al. |
| 6,672,921 B1 | 1/2004 | Liang et al. |
| 6,673,533 B1 * | 1/2004 | Wohlstadter .......... B01L 3/5027 204/400 |
| 6,704,133 B2 | 3/2004 | Gates et al. |
| 6,788,449 B2 | 9/2004 | Liang et al. |
| 6,864,875 B2 | 3/2005 | Drzaic et al. |
| 6,866,760 B2 | 3/2005 | Paolini, Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,075,502 B1 | 7/2006 | Drzaic et al. |
| 7,116,318 B2 | 10/2006 | Amundson et al. |
| 7,167,155 B1 | 1/2007 | Albert et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,535,624 B2 | 5/2009 | Amundson et al. |
| 7,561,324 B2 | 7/2009 | Duthaler et al. |
| 7,667,684 B2 | 2/2010 | Jacobson et al. |
| 7,679,157 B2 | 3/2010 | Miida |
| 7,679,814 B2 | 3/2010 | Paolini, Jr. et al. |
| 7,791,789 B2 | 9/2010 | Albert et al. |
| 7,839,564 B2 | 11/2010 | Whitesides et al. |
| 7,910,175 B2 | 3/2011 | Webber |
| 7,952,790 B2 | 5/2011 | Honeyman et al. |
| 7,956,841 B2 | 6/2011 | Albert et al. |
| 8,009,348 B2 | 8/2011 | Zehner et al. |
| 8,040,594 B2 | 10/2011 | Paolini, Jr. et al. |
| 8,054,526 B2 | 11/2011 | Bouchard |
| 8,098,418 B2 | 1/2012 | Paolini, Jr. et al. |
| 8,213,076 B2 | 7/2012 | Albert et al. |
| 8,319,759 B2 | 11/2012 | Jacobson et al. |
| 8,363,299 B2 | 1/2013 | Paolini, Jr. et al. |
| 8,441,714 B2 | 5/2013 | Paolini, Jr. et al. |
| 8,441,716 B2 | 5/2013 | Paolini, Jr. et al. |
| 8,466,852 B2 | 6/2013 | Drzaic et al. |
| 8,576,470 B2 | 11/2013 | Paolini, Jr. et al. |
| 8,576,476 B2 | 11/2013 | Telfer et al. |
| 8,593,721 B2 | 11/2013 | Albert et al. |
| 8,797,634 B2 | 8/2014 | Paolini, Jr. et al. |
| 8,830,559 B2 | 9/2014 | Honeyman et al. |
| 8,873,129 B2 | 10/2014 | Paolini, Jr. et al. |
| 8,902,153 B2 | 12/2014 | Bouchard et al. |
| 9,170,467 B2 | 10/2015 | Whitesides et al. |
| 9,199,441 B2 | 12/2015 | Danner |
| 9,293,511 B2 | 3/2016 | Jacobson et al. |
| 9,436,056 B2 | 9/2016 | Paolini, Jr. et al. |
| 2003/0076573 A1 * | 4/2003 | Gates .................... G02F 1/1343 359/245 |
| 2007/0035683 A1 * | 2/2007 | Yoshii ............... G02F 1/136209 349/110 |
| 2008/0043318 A1 | 2/2008 | Whitesides et al. |
| 2008/0048970 A1 | 2/2008 | Drzaic et al. |
| 2009/0225398 A1 | 9/2009 | Duthaler et al. |
| 2010/0156780 A1 | 6/2010 | Jacobson et al. |
| 2012/0086323 A1 | 4/2012 | Somers |
| 2012/0293858 A1 | 11/2012 | Telfer et al. |
| 2012/0326957 A1 | 12/2012 | Drzaic et al. |
| 2015/0109651 A1 * | 4/2015 | Branda ............ B29D 11/00634 359/238 |
| 2015/0168799 A1 * | 6/2015 | Emori .................... G01M 11/30 324/750.01 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

* cited by examiner

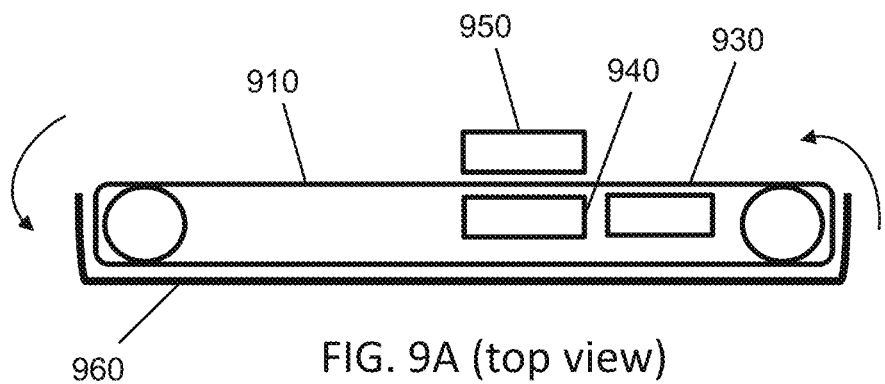
FIG. 9A (top view)
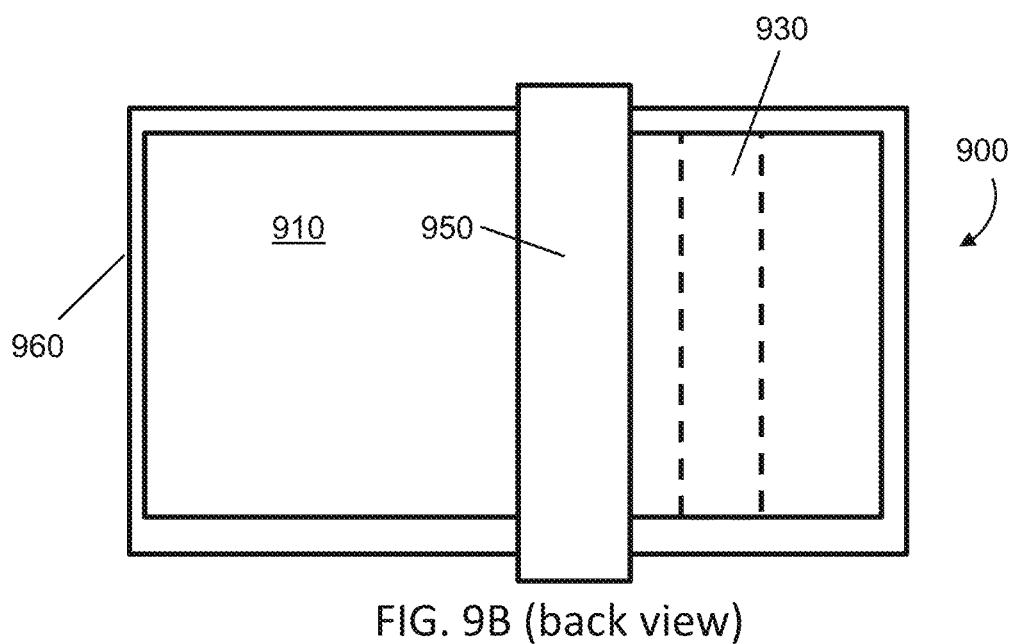
FIG. 9B (back view)
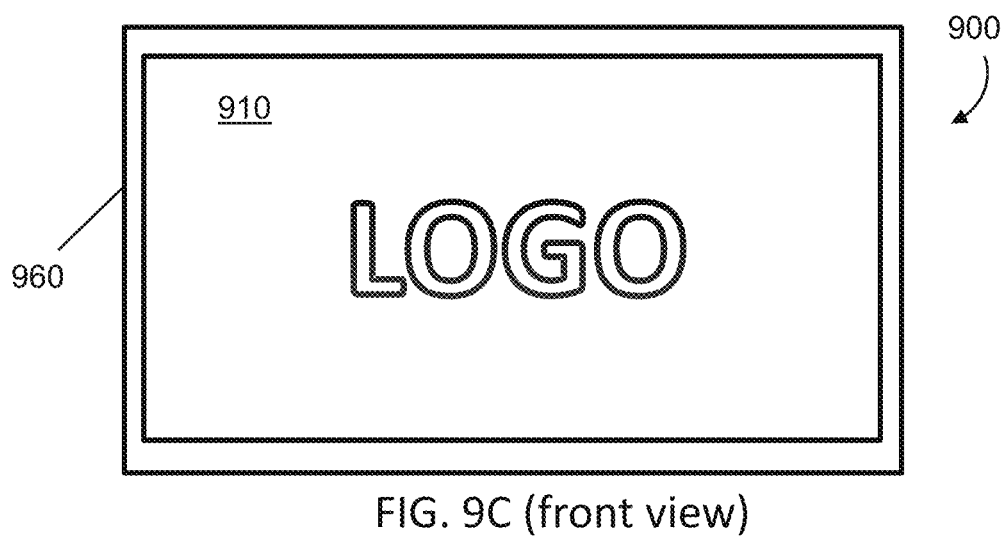
FIG. 9C (front view)

REUSABLE DISPLAY ADDRESSABLE WITH INCIDENT LIGHT

RELATED APPLICATIONS

This application is a divisional of co-pending U.S. application Ser. No. 15/223,697, filed Jul. 29, 2016, which claims priority to U.S. Provisional Application No. 62/200,739, filed Aug. 4, 2015, both of which are incorporated herein by reference in their entireties.

BACKGROUND OF INVENTION

This invention relates to reflective electro-optic displays and materials for use in such displays. More specifically, this invention relates to electro-optic displays incorporating front color filters and photoconductive materials within the display. The display can be "written" with an external illuminated image, e.g., with an LCD projector. The display will display the color image for a time with minimal or no additional energy input, and may be subsequently re-written, as desired.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a display or drive scheme which only drives pixels to their two extreme optical states with no intervening gray states.

The term "pixel" is used herein in its conventional meaning in the display art to mean the smallest unit of a display capable of generating all the colors which the display itself can show. In a full color display, typically each pixel is composed of a plurality of sub-pixels each of which can display less than all the colors which the display itself can show. For example, in most conventional full color displays, each pixel is composed of a red sub-pixel, a green sub-pixel, a blue sub-pixel, and optionally a white sub-pixel, with each of the sub-pixels being capable of displaying a range of colors from Hack to the brightest version of its specified color.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", *IDW Japan,* 2001, Paper HCS1-1, and Yamaguchi, Y., et al., "Toner display using insulative particles charged triboelectrically", *IDW Japan,* 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MET) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0257269; and 2012/0326957; (f) Methods for driving displays; see for example U.S. Pat. Nos. 7,012,600 and 7,453,445;
(g) Applications of displays; see for example U.S. Pat. Nos. 7,312,784 and 8,009,348; and
(h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

In yet another embodiment, such as described in U.S. Pat. No. 6,704,133, electrophoretic displays may be constructed with two continuous electrodes and an electrophoretic layer and a photoconductive layer between the electrodes. Because the photoconductive material changes resistivity with the absorption of photons, incident light can be used to alter the state of the electrophoretic medium. Such a device is illustrated in FIG. 1. As described in U.S. Pat. No. 6,704,133, the device of FIG. 1 works best when driven by an emissive source, such as an LCD display, located on the opposed side of the display from the viewing surface. In some embodiments, the devices of U.S. Pat. No. 6,704,133 incorporated special barrier layers between the front electrode and the photoconductive material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Polyethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Many types of electro-optic media are essentially monochrome, in the sense that any given medium has two extreme optical states and a range of gray levels lying between the two extreme optical states. However, there is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another.

The position of the color filter array (CFA) relative to the electro-optic medium in the optical stack can vary widely, but must take into account the type of electro-optic medium used and, in some cases, the properties of other layers of the optical stack. Color displays using CFA's can be broadly divided into two classes, namely front CFA displays (in which the CFA lies between the electro-optic medium and the viewing surface through which an observer views the display) and rear CFA displays (in which the CFA lies on the opposed side of the electro-optic medium from the viewing surface). If the electro-optic medium used is transmissive (i.e., light, typically from a backlight, passes through the electro-optic medium, which acts as a light valve controlling the amount of light which passes through each pixel, and then emerges from the viewing surface), the CFA can occupy any position in the optical stack, since regardless of the position of the CFA, light will pass through both the CFA and the electro-optic medium. Thus, both front and rear CFAs can be used with transmissive electro-optic media, although the former are probably more common.

When the electro-optic medium is reflective, as are most electrophoretic media, a front CFA is commonly used because if the CFA was placed below the electrophoretic media, very little light would interact with the CFA. U.S. Pat. No. 7,839,564 describes an inverted front plane laminate comprising an adhesive layer including a plurality of colored segments (sub-pixels), a monochrome electrophoretic medium layer having black and white extreme optical states, and a rear adhesive layer. The adhesive layer described in U.S. Pat. No. 7,839,564 requires the colored segments of adhesive to be aligned with the pixel electrodes, which may be, for example, a matrix of thin-film transistors (TFTs). This construction allows sub-pixels of the CFA to be independently controllable, which is necessary to produce moving color images.

Positioning the CFA between the electro-optic layer and the rear electrodes does, however, place the CFA between the electrodes of the display, which means that the electrical properties of the CFA become important. Electrical properties are not typically a major consideration in commercial CFA materials, and difficulty may well be experienced in finding a material with the right combination of color and electrical properties. Furthermore, the CFA material must also satisfy the conventional requirements of high stability (e.g., resistance to degradation from UV light) and resistance to electrochemical reactions which may occur at the electrodes. It may be difficult, economically infeasible or impossible to find any available materials which meet both the electrical and conventional requirements simultaneously. Furthermore, alignment of the CFA sub-pixels and the pixel electrodes requires precision indexing of the materials and expensive laminating equipment.

In some instances, an electro-optic display is constructed with the CFA beneath the electro-optic medium. In a rear CFA electro-optic display, the CFA may be disposed between the electro-optic layer and the rear electrodes, or may be disposed on the opposed side of the rear electrodes from the electro-optic layer, but the former location is generally preferred because it reduces the distance between the electro-optic layer and the CFA (thus reducing parallax between the two layers and possible color distortions caused by light leaving the display at a substantial angle to the normal), and because it simplifies display construction; since production of color requires reflection of light from either the CFA or a layer disposed behind the CFA, it is convenient to use a light-transmissive CFA and rely upon reflective rear electrodes to effect the necessary light reflection, rather than having to provide light-transmissive rear electrodes to enable light to reach a CFA disposed behind the rear electrodes, and then either make the CFA itself reflective or provide a separate reflector behind the CFA. U.S. Patent Publication 2014/0362131 describes a rear CFA electro-optic display in which the electro-optic medium is capable of two opaque states and a light-transmissive state. The color saturation of the resulting display may be improved by incorporating fluorescent or phosphorescent materials into the rear color filter array.

SUMMARY OF INVENTION

The invention provides a reflective color display that can be addressed from the front (viewing surface side) of the display with a light source, such as a projector, LED, or laser. The display comprises (in order) a color filter array, a transparent electrode, an electro-optic medium, a photoconductive material, and a rear electrode. In most embodiments, the rear electrode is a continuous layer of conductive material. In other words, in most embodiments, the invention does not require a rear electrode having individually-addressable pixels, and the pixels of the color filter array do not need to be aligned with individual rear electrodes. When the electrodes are biased favorably, incident light from the light source will alter the conductivity of the photoconductive material, thereby allowing the state of the electro-optic medium adjacent the photoconductive material to be altered by the electric field. Thus, the electro-optic medium will change states where it has been exposed to light. For example, exposure to light may cause the electro-optic medium to change from a black to a (reflective) white state. In this instance, an image projected onto the display will be reproduced by the display. The image will remain on the display until a later time when the image is cleared or reset.

The invention additionally provides a method of displaying a reflective image. The method includes providing a display of the invention (i.e., comprising (in order) a color filter array, a transparent electrode, an electro-optic medium, a photoconductive material, and a rear electrode), supplying an electrical potential between the electrodes of the display, and exposing the display to a source of patterned light. The source of patterned light can be any suitably bright source, such as provided by a projector, e.g., an LCD projector, a laser, or an LED. Once the image of the patterned light has been captured by the display, the electrical potential can be removed, i.e., by breaking a circuit, whereupon the potential difference between the electrodes will not be great enough to drive a state transition in the electro-optic medium. Because the electro-optic medium is bistable, the display will retain the image even in the presence of additional incident light. Thus, the display can be the foundation for a reusable billboard or poster that is in direct sunlight, a location that is often unfavorable for conventional electro-optic displays, e.g., LCD displays.

In some embodiments, the displays of the invention are used in a display system for reflective images. Such display systems comprise a display of the invention (i.e., comprising (in order) a color filter array, a transparent electrode, an electro-optic medium, a photoconductive material, and a rear electrode), a voltage supply (power supply) for providing the voltages to the electrodes to allow the electro-optic medium to change states, and a controller to regulate the voltage delivered to the electrodes. In some embodiments, the controller will provide specific time-dependent voltage waveforms to the electrodes to allow the display to be cleared ("wiped") or to retain the image ("write"). Other embodiments of a system may include other devices to improve the performance of the display or to facilitate wiping and writing, such as additional illumination sources, such as LEDs to provide low-power ambient lighting, or a projector to facilitate regular changes in the image. For example, a system may include an LCD projector operatively coupled to the controller so that that the display will be wiped and ready for re-writing when the LCD projector is turned on. Such a system may be used to provide regularly-updated advertising content, or information about transportation and events.

BRIEF DESCRIPTION OF DRAWINGS

In FIG. 7A a blue LED pen is used to draw a design only through the blue elements of the color filter array.

FIG. 9A is a top view of an embodiment of a billboard incorporating a display medium of the invention without a rear electrode and an array of light sources to write an image onto the display medium which is moved past the array.

FIG. 9B is a back view of an embodiment of a billboard incorporating a display medium of the invention.

FIG. 9C is a front view of an embodiment of a billboard incorporating a display medium of the invention.

DETAILED DESCRIPTION

As indicated above, the present invention provides a reusable display medium for providing messaging and advertising in large formats. Specifically, the invention includes displays comprising a color filter array (CFA), a transparent electrode, an electro-optic medium, a photoconductive material, and a rear electrode. In some embodiments, the displays can be incorporated into large format displays such as posters or billboards. In some embodiments, the displays incorporate reflective, rather than emissive, electro-optic media. Reflective media are particularly well-suited for high-background lighting environments, such as outdoor advertising, because emissive electro-optic media must supply light in excess of the ambient light to be viewed from far away. The disclosed displays are also more energy efficient than state-of-the-art reusable displays because the displays only require small amounts of energy for refreshing the content, after which they operate substantially without additional energy.

Figure 1:
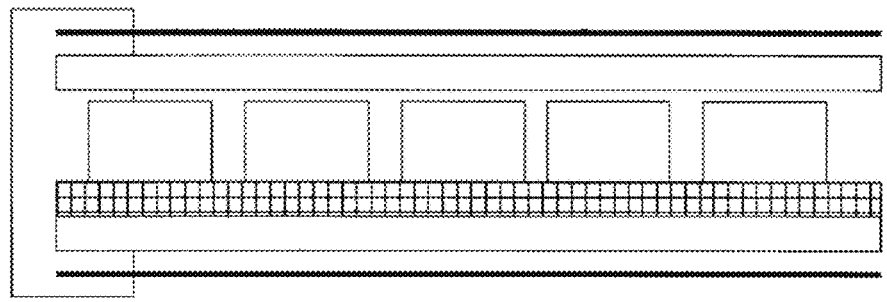
FIG. 1 shows a prior art electro-optic display comprising a photoconductive layer.
Figure 2:
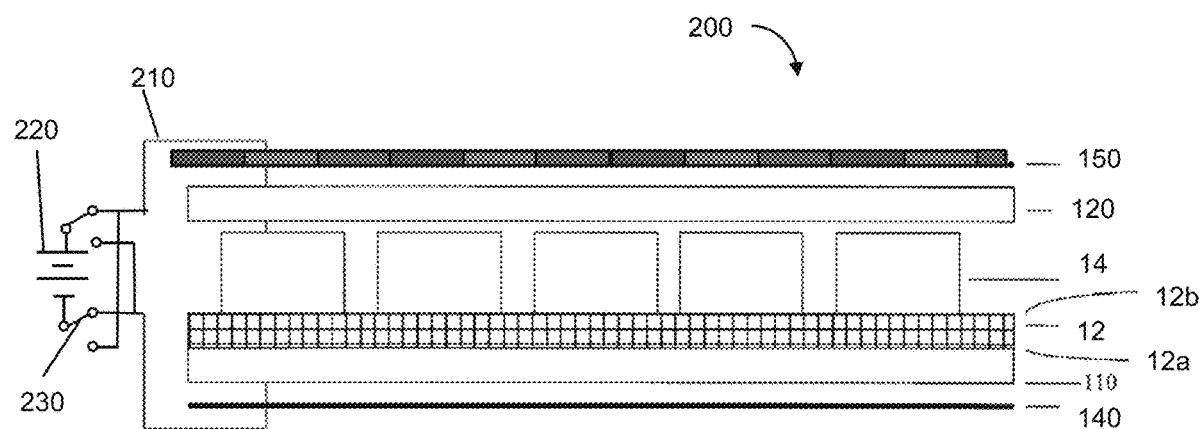
FIG. 2 illustrates an electro-optic display comprising a front color filter array (CFA), and including a photoconductive layer.

FIG. 2 shows a display of the invention 200. The display 200 includes a photoconductive layer 12, an electro-optic medium 14, a rear electrode 110, a transparent electrode 120, and a color filter array (CFA) 150. The display 200 has a front, or viewing, side and a rear side. The photoconductive layer 12 has a first side 12a and a second side 12b. Although not required in all embodiments, the display 200 includes a protective layer 140 adjacent the rear electrode 110. The CFA 150 can also act as a protective layer for the transparent electrode 120. While the display 200 is shown as flat, displays 200 may be created that are curved, or flexible, depending upon the needs of the application.

The transparent and rear electrodes 120 and 110, respectively, are biased with an electrical potential that is supplied by a source of electrical potential 220 using electrical connections 210. The electrical potential supplied by the source 220 may be essentially DC, or it may be time-dependent. Typically, the electrical connection 210 between the source 220 and the electrodes 110 and 120 is interruptible, e.g., with a switch 230. Typically, the switch 230 is controlled electronically, so that the correctly-biased electrical potential can be applied to the electrodes as needed. In some instances, the source 220 is coupled to a controller (not shown) that can be programmed to modify the time and the magnitude of the electrical potential. For example, the controller can be used to apply a time dependent waveform to the electrodes, of the type disclosed in the patents and applications described in the Background. In some embodiments, the controller will include a central processing unit, memory, and instructions for controlling the time and magnitude of an electrical potential applied between the electrodes 110 and 120

Exposing the photoconductive layer 12 to light reduces its impedance, permitting the electric field between electrodes 110 and 120 to address the electro-optic medium 14. Photoconductive materials useful as the photoconductive layer 12 of display 200 include organic photoconductive polymers, dye-aggregate photoreceptors, and pigment-based photoconductors. Photoconductive materials for use in displays 200 of the invention are preferably organic photoconductive polymers. An example of an organic photoconductive polymer is 2,4,7-trinitro-9-fluorenone complexed with poly(N-vinylcarbazole). For pigment-based photoconductors, the pigment particles themselves may be photoconductive, so that the photoactive and optically active components are the same.

Surprisingly, the inventors have found that it is possible to address a display of the invention with incident light from the display side, even though the photoconductive layer, which interacts with the incident light, is on the opposite side of the electro-optic medium from the incident light. As mentioned previously, the displays disclosed in U.S. Pat. No. 6,704,133 also included a photoconductive layer opposed from the viewing surface. However, the displays of U.S. Pat. No. 6,704,133 were intended to be addressed from the backside specifically because it was believed that the incident light would not traverse the electro-optic medium. The inventors have found that with the addition of a biasing voltage it is possible to address the photoconductive layer through the electro-optic layer, for example, an electrophoretic medium comprising charged particles in a fluid.

Examples of other photoconductive materials from which the photoconductive layer 12 may be formed include inorganic and organic photoconductive materials, layered photoconductive materials having inorganic or organic compositions, and composite layered devices containing photoconductive materials in a polymer matrix. Exemplary photoconductive materials include, for example, an inorganic photoconductive composition or an organic photoconductive composition dispersed in a resinous binder material such as, for example, a poly(hydroxyether) material. One example of a composite layered device is a dispersion of zinc oxide particles in a polymer matrix. Useful polymer matrices include those that are incapable of transporting for any significant distance injected charge carriers generated by the photoconductive material. Such useful polymer matrices include, but are not limited to, polystyrene resins, silicone resins, acrylic and methacrylic ester polymers, polymerized ester derivatives of acrylic acids, α-acrylic acids and α-methacrylic acids, chlorinated rubber, vinyl polymers and copolymers, and cellulose esters.

Other known photoconductive materials which may be useful in the present invention include hydrogenated amorphous silicon, cadmium selenide, gallium arsenide, trigonal selenium, amorphous selenium, doped amorphous selenium substances, halogen doped amorphous selenium substances, amorphous selenium alloys, doped amorphous selenium alloys, including selenium arsenic, selenium tellurium, selenium arsenic antimony, halogen doped selenium alloys, wherein the dopant is a material such as chlorine, iodine, bromine, sodium or fluorine, cadmium sulfide, an alkali metal, and the like. Selenium alloys that may be used may comprise, for example, selenium-tellurium-arsenic; in one embodiment a halogen doped selenium arsenic alloy is employed. Other inorganic photoconductive materials may include, for example, cadmium sulfoselenide, cadmium selenide, and cadmium sulfide. The organic photoconductive composition may include, for example, a metal free phthalocyanine, a metal phthalocyanine, a charge transfer complex material, a squarilium dye, and a vanadyl phthalocyanine. Generally, these photoconductive materials are deposited on a suitable substrate, such as a glass, plastic, or polyester substrate.

The photoconductive layer 12 is preferably formed from a material having an absorption activity that is substantially matched to the visible spectrum, however, it is possible to tune the photoconductive layer 12 so that it responds to light outside of the visible spectrum, e.g., infrared or ultraviolet light. The wavelength sensitivity of the photoconductor is dependent on the composition of the charge generator. For example, if the charge generator is primarily selenium alloys, the photoconductive material is most sensitive to blue light near the 400 nm wavelength range. Alternatively, if the charge generator is mainly phthalocyanine pigments, the photoconductive material is most sensitive to red light near the 700 nm wavelength range.

The photoconductive layer 12 is typically spread onto rear electrode 110 as a paste or dispersion, however, the photoconductive layer may be partially dissolved in a solvent so that it can be sprayed onto the rear electrode 110. In some embodiments, the photoconductive layer is deposited as a pattern of islands, e.g., using an inkjet printer, so that the photoconductive materials are very localized, and do not allow neighboring elements of the CFA 150 to experience electric fields sufficient to address the electro-optic medium 14 between the electrodes.

Electro-optic media 14 for use in displays 200 of the invention may include any display media that is bistable. The definition of a bistable depends on the application for the display 200. A slowly-decaying optical state can be effectively bistable if the optical state is substantially unchanged over the required viewing time. For example, in a display which is updated every few minutes, a display image which is stable for hours or days is effectively bistable for that application. In this invention, the term bistable also indicates a display with an optical state sufficiently long-lived as to be effectively bistable for the application in mind. In practice, some electro-optic displays are capable of achieving multiple gray states, and are stable not only in their extreme black and white optical states, but also in their intermediate gray states. Such displays may be described as "multi-stable".

Examples of electro-optic media 14 suitable for use include rotating bichromal spheres or cylinders, retroreflective liquids of differing dielectric constants (i.e., suspended liquid displays). In one embodiment, the electro-optic medium 14 is an encapsulated medium comprising electrophoretic particles, such as the electro-optic medium described in the patents and applications discussed above. In some other embodiments, the electro-optic material is dispersed within one or more wells defined by a polymer matrix. The wells may be formed by, for example, embossing, etching, punching, slitting stretching, stamping, extruding and injection molding the shape of the matrix onto the polymer material.

In preferred embodiments, the electro-optic medium 14 is a particle-based electrophoretic medium, in which a plurality of charged particles will move through a fluid under the influence of an electric field. This medium is particularly-well suited for displays 200 of the invention because the medium can be addressed by DC voltages and draws very little current. As such, the conductive leads and electrodes used to deliver the voltage to electrophoretic particle-based ink displays can be of relatively high resistivity, and/or flexible.

In some embodiments, either or both of the electrodes 110, 120 may be replaced by an alternative mechanism applying an electric field to the electro-optic medium 14. For example, electrostatic charge may be deposited to one side of the electro-optic medium 14, one side of the photoconductive layer 12, or both the electro-optic medium 14 and the photoconductive layer 12. In other embodiments, the display 200 may be created without the rear electrode 110, and the electro-optic medium can be prepared for "writing" with an illuminated pattern by movable electrodes (not coupled to the medium) that deliver an electrical potential to the electro-optic medium 14 and/or the photoconductive layer 12. In still other embodiments, a stylus-type addressing apparatus may be used to apply electrostatic charge to one side of the electro-optic medium 14 or the photoconductive layer 12.

Figure 3A:
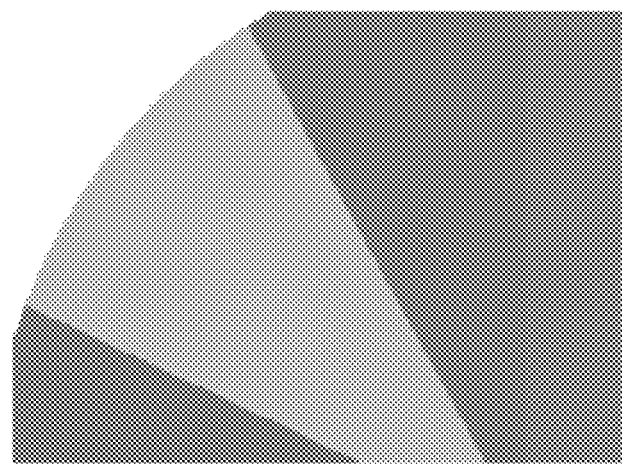
FIG. 3A shows an exemplary colored pattern for illuminating a display of the invention in order to write the image onto the display.
Figure 3B:
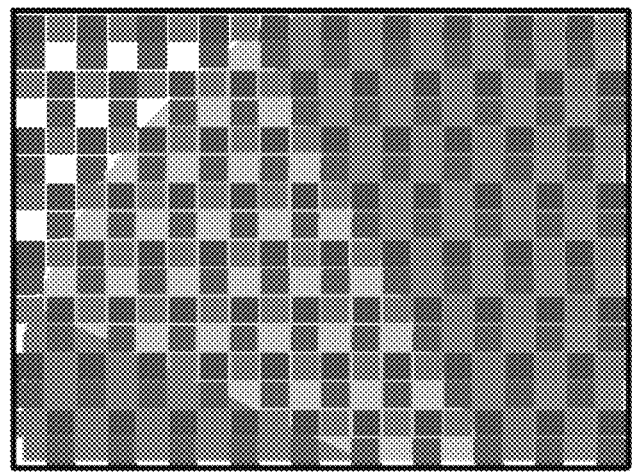
FIG. 3B shows the exemplary color pattern of FIG. 3A mapped onto a RGBW color filter array, such as found on the front surface of a display of the invention.
Figure 3C:
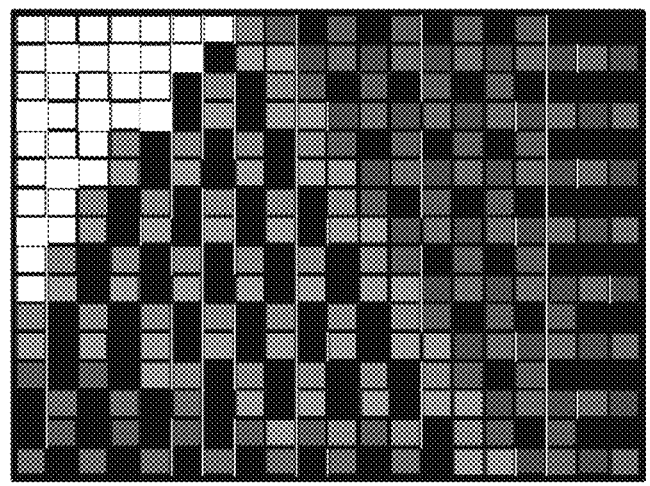
FIG. 3C shows the response of a bistable black/white electro-optic medium beneath the color filter array shown in FIG. 3B.

As shown in FIGS. 2, 3B, and 3C, the CFA 150 typically comprises a plurality of sub-pixels comprising filter areas specific to a desired color. The CFA 150 can be comprised of any suitable material, e.g., glass or polymer, and may include one or more coatings for improved performance. For example, CFA 150 may include an anti-reflection coating to improve transmission through the CFA 150. CFA 150 may also include a UV-reflective coating to diminish the amount of shorter wavelength energy that reaches the electro-optic medium 14 and/or the photoconductive layer 12. In some embodiments, the sub-pixels of the CFA 150 will be constructed and arranged to display three different colors (e.g., red, green, and blue; cyan, magenta, and yellow; or any other suitable combination). In some embodiments, the sub-pixels will be arranged to include a white (transparent) region (e.g., red, green, blue, and white; cyan, magenta, yellow, and white; or any other suitable combination). In some cases, the sub-pixels will be arranged to display four, five, six, or more colors. In embodiments with white sub-pixels, the white sub-pixels can allow a relatively large amount of light to be reflected, compensating for the region(s) of the sub-pixel covered by colored material that result in substantially less light to be reflected from the surface. Such an arrangement can allow for proper operation of the display, depending upon the needs of the application. In some embodiments, at least about 5%, at least about 10%, at least about 25% and/or less than about 50% of the area of the CFA is not covered by colored material.

The colored sub-pixels of the CFA 150 can be arranged in a variety of patterns to achieve the desired mixture of colors and/or color saturation. FIG. 3B, for example, shows an RGBW pattern that would be suitable for use with the invention. In FIG. 3B, the sub-pixels comprise a first (e.g., green) colored material, a second (e.g., red) colored material, and a third (e.g., blue) colored material, and a transparent material (a.k.a. white). In FIG. 3B, the colored sub-pixels are squares, but it should be understood that other suitable shapes can also be used, in addition to, or in place of, squares. Other suitable shapes include circles, ellipses, triangles, shapes with 5, 6, 7, 8, or more sides, and the like. Any of the shapes outlined above can be used alone or in combination with other shapes. In addition, while FIG. 3B illustrates the use of red, green, and blue colored materials, it should be understood that any suitable colors in place of or in addition to red, green, and blue can be employed.

As shown in FIG. 3B, each colored material is disposed within a single continuous region with well-defined edges. However, in other embodiments, each sub-pixel can comprise diffuse regions of colored material, or mixtures of closely-related colors. Additionally, the sub-pixels do not need to touch. They may be separated by areas of transparent material or, alternatively, areas of absorptive material, for example a black grid, as required. For example, the colored sub-pixels may be formed as a series of three discontinuous rectangles on a grid of transparent material. In some embodiments, it may be advantageous to produce a CFA 150 having well-defined and/or diffuse and/or discontinuous sub-pixels of colored material. In some embodiments, the sub-pixels in a pixel may not be balanced, that is each sub-pixel may be more or less than 1/n, where n is the number of sub-pixels in a pixel. For example, an RGBW pixel may include W sub-pixels that are less than 25% of the pixel area, e.g., less than 20% of the pixel area, e.g., less than 15% of the pixel area, e.g., less than 10% of the pixel area.

In some embodiments, the color intensity can vary across a lateral dimension of the pixel such that one area of the pixel is densely colored and another portion of the pixel is substantially colorless, with other regions containing intermediate color intensities. Such a variation in color density can be achieved using a variety of methods. For example, such a pattern could be developed by using a colored material which develops (or loses) its color upon exposure to radiation, and selectively scanning the pixel using a radiation source. A similar effect can be achieved by patterning the colored material to form spatially dense dots (or other suitable shapes) toward the middle region of the pixel and spatially sparse dots near the edges of the pixel.

Aside from varying the variety of sub-pixel colors and the arrangement of the sub-pixels, the relative areas of each colored sub-pixel may be varied. For example, if a common background color is to be used, e.g., blue, a larger number of blue sub-pixels may be included in the CFA 150, e.g., as compared to the number of red sub-pixels. Alternatively, shades of intermediate colors (e.g., purple) can be skewed toward one sub-pixel color (e.g., red) by altering the relative amounts of one sub-pixel versus the others.

The CFA 150 and the patterns of colored sub-pixels described herein can be achieved using any suitable manufacturing process. For example, in some embodiments, photolithography (e.g., using a colored material comprising a photoresist) can be used to produce the desired distribution of colored material within the sub-pixel. Other exemplary processes that can be used to produce patterned colored materials include, but are not limited to, ink jet printing and thermal transfer printing.

In a display 200 of the invention, light passes through the CFA 150 at all times, regardless of the state of the underlying electro-optic layer. The transparent electrode 120, beneath the CFA 150, allows most light that passes through the CFA 150 to pass on to the electro-optic medium 14. While most of the incident light reaching the electro-optic medium 14 will be reflected or absorbed, depending upon the state of the medium, some amount of the incident light will pass through the electro-optic medium and strike the photoconductive layer 12, When the light reaches the photoconductive layer 12, the resistance of the photoconductive layer 12 in this region is lowered. Accordingly, in these regions the electrical potential across the electro-optic medium 14 will now be sufficient to address the electro-optic medium 14, causing a change in state, e.g., from black to white.

Referring again to FIG. 2, one or more protective layers 140 may be disposed on the display 200. In particular, the rear electrode 110 will typically require a protective layer 140 to insulate the rear electrode from an adjoining material, such as a substrate. In some embodiments, the substrate may serve a dual role as mechanical support and insulation. Protective layers 140 are useful for embodiments in which one or more of the electrodes 110, 120 are replaced with an alternate means for applying electrostatic charge, as described above. In one embodiment, a protective layer 140 is adjacent the rear electrode 110 and the CFA 150.

The function of the display 200 is illustrated in FIGS. 3A-3C. An exemplary color wheel image is shown in FIG. 3A. This image is projected against the front of a display 200 of the invention; e.g.; using an LCD projector. FIG. 3B illustrates the color wheel pattern of FIG. 3A projected upon the CFA 150. For subpixels that are of the matching color (e.g., green), the projected light will pass through the CFA 150 and the transparent electrode 120, striking the electro-optic layer 14. Some portion of this incident light will pass through the electro-optic layer 14, striking the photoconductive layer 12, and causing a localized change in the conductivity between the transparent 120 and rear 110 electrodes under that subpixel. With the change in conductivity, the state of the electro-optic medium 14 will also change under that sub-pixel. For example, in the instance where the electro-optic medium 14 begins in a dark state, the electro-optic medium 14 will change to a white state, thereafter reflecting incident light in the color of the sub-pixel, as shown in FIG. 3C.

For the sub-pixels that are white (transparent), the projected light will strike the photoconductive layer 12 regardless of the color, causing the electro-optic medium 14 to change to white or intermediate gray, depending upon design of the display and the specific needs of the application. Because there is no color associated with these sub-pixels, the subpixels will, thereafter, reflect white or gray light. For the sub-pixels that are colored, but do not match the color of the projected light, little to no light will pass through the CFA 150 and the electro-optic medium 14 to reach the photoconductive layer 12. In this instance, the electro-optic medium 14 will remain in its initial state, typically black. In instances where the light is partially transmitted by the colored sub-pixel, the end result will be a gray level in the underlying electro-optic medium, as shown in FIG. 3C. The end result of this process is that a projected image is captured, in a pixelated form, on a large format display. If the sub-pixels are substantially smaller in width than the distance from which the display is viewed, the granularity of the display 200 will not be noticeable.

As discussed above, the invention uses an electro-optic medium 14 with an initial black state, and the display 200 is illuminated with a positive color (true color) image. However, it is understood that the invention can be practiced by starting with an electro-optic medium 14 in a white state and projecting a negative (reverse color) image on the display. Furthermore, the color saturation of the projected image can be modified, as needed, to obtain an image with the correct hues. For example, it may be desired that a billboard display a logo with a particular shade of blue. Illuminating the display 200 with the desired shade of blue may not result in a matching shade because of the presence of the red and green sub-pixels. However, with the use of an RGB LCD projector, it is straightforward to adjust the color levels in the projected image so that the final displayed image matches the desired shade of blue. In other embodiments, a test pattern may be used to adjust the color levels in the projector so that the final projected image results in a retained image with the desired colors.

Figure 4:
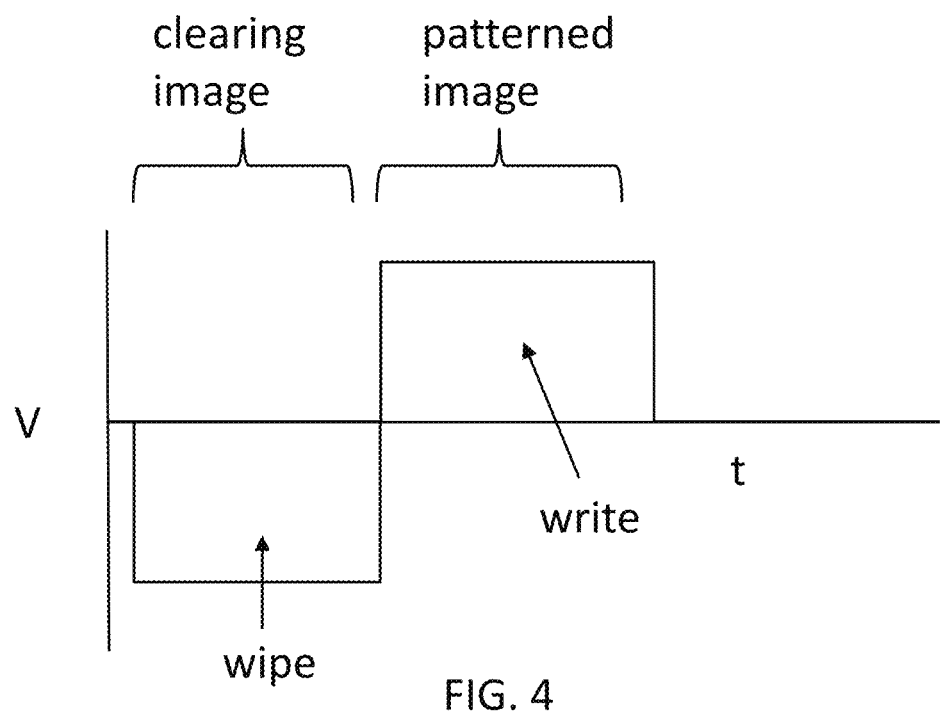
FIG. 4 illustrates a drive scheme for clearing images from a display and then writing a new image on the display.
Figure 5:
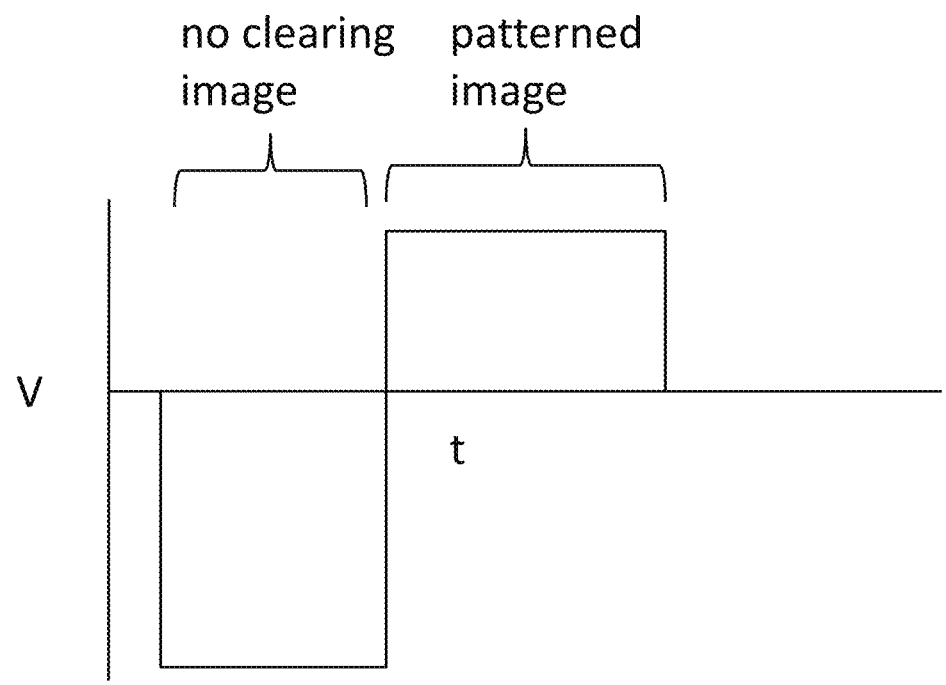
FIG. 5 illustrates an alternate drive scheme for clearing images from a display and then writing a new image on the display.

Time-dependent electrical potentials (waveforms) for preparing a display 200 for writing, and for writing the display, are shown in FIGS. 4 and 5. In one embodiment, illustrated in FIG. 4, a first electrical potential is applied to the transparent and rear electrodes 120 and 110. The first electrical potential is insufficient to drive the electro-optic medium 14 to a starting state in the absence of additional light to change the conductivity of the photoconductive layer 12. However, when the electrodes 120 and 110 are biased at that level, and a clearing image is projected onto the display, the electro-optic media will change to the desired starting state. Typically, the desired starting state will be black in an electrophoretic encapsulated medium and, the projected clearing image will be a bright white light.

Once the display has been cleared ("wiped"), the polarity of the potential is reversed, as shown in FIG. 4, and the patterned image is shown onto the display. As described above with respect to FIGS. 3A-3C, the patterned image will cause the electro-optic medium to switch to the reverse state (e.g., white) where the light from the patterned image passes through the CFA 150. Once the patterned image has been written to the display 200, the potential is removed, thus preventing additional incident light from writing to the display 200.

In an alternate embodiment, shown in FIG. 5, a clearing potential is applied that is sufficient to drive the electro-optic medium 14 to the start state (e.g., black). As shown in FIG. 5, it is not necessary to apply a clearing image because the magnitude of the electrical potential in the "wipe" pulse is greater than the magnitude of the potential in the "write" pulse. Once the electro-optic medium 14 is in the start state, the display is illuminated for writing as described above with respect to FIG. 4.

The electro-optic medium 14 is not limited to only white and black, however. For example, the initial "write" state might be a gray level between white and black. Furthermore, pixels receiving full intensity exposure during the write phase (i.e., a white sub-pixel of the CFA or a colored sub-pixel illuminated with a matching color) may be driven to a gray level, rather than white, by decreasing the voltage between the electrodes, 110 and 120, or by modifying the displayed image to intentionally decrease the light intensity of the projected image. (When a digital projector, e.g., an LCD projector, is used to write the image, it is straightforward to adjust the color balance and intensity to produce the desired final image.) In other embodiments, a "finish" voltage waveform may be used to adjust the state of the electro-optic medium 14 after an image has been written. A finish waveform may, for example, drive the entire electro-optic medium more toward the white or the black state, depending upon the needs of the final image.

Figure 6A:
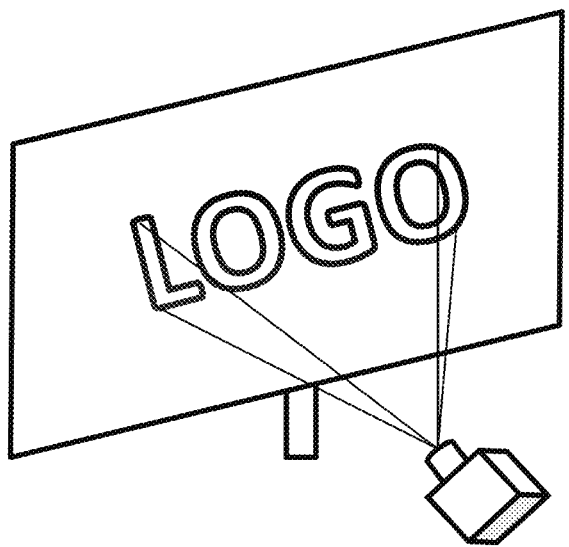
FIG. 6A illustrates a billboard incorporating a display of the invention, and illumination (writing) with an LCD projector.
Figure 6B:
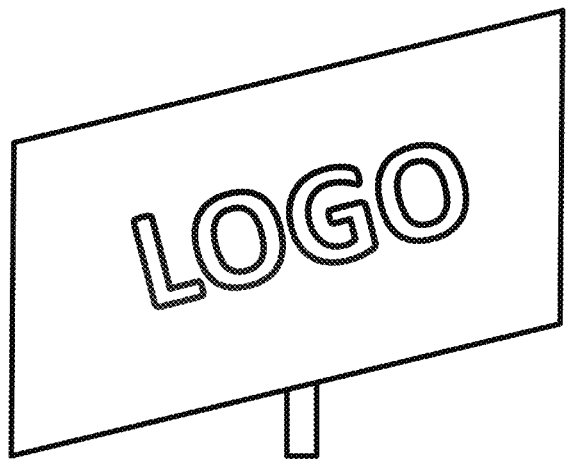
FIG. 6B illustrates the billboard of 6A after illumination. The billboard will retain the image independently, without requiring additional power.

The displays of the invention are well suited for large format displays that will be changed regularly. For example, a billboard, illustrated in FIGS. 6A and 6B, may be written repeatedly with differing content. When the content is to be changed, the display is merely "wiped" and rewritten, as shown in FIG. 6A. If a stable electro-optic medium is used, the written image will be displayed for some time, as shown in FIG. 6B. In some embodiments, the image will be stable for greater than 10 minutes, e.g., greater than 30 minutes, e.g., greater than one day, e.g., greater than one week, e.g., greater than two weeks, e.g., greater than one month, e.g., greater than six months, e.g., greater than one year. For outdoor applications, such as shown in FIGS. 6A and 6B, it will be beneficial to write an image to the display during the night, so that incident sunlight will not interfere with the writing process.

Figure 7A:
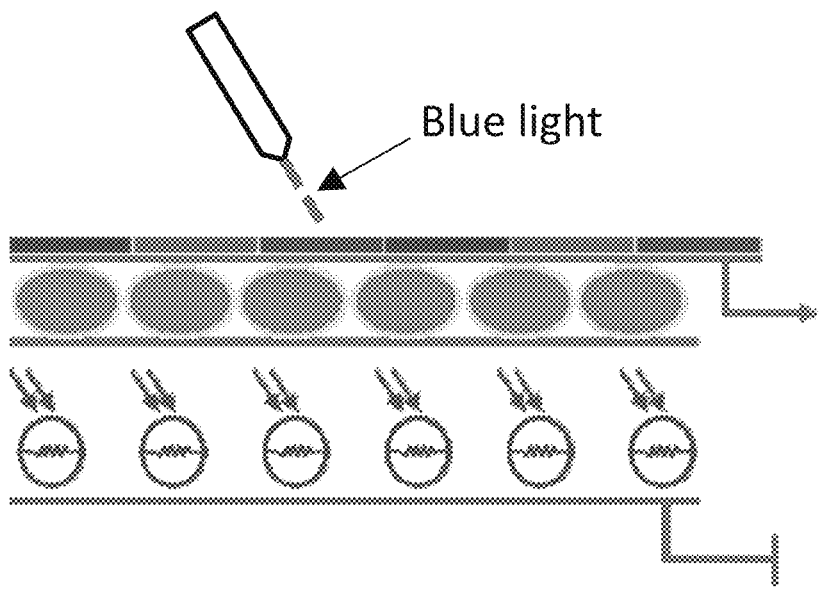
FIG. 7A shows an alternate method for writing an image to a display of the invention.
Figure 7B:
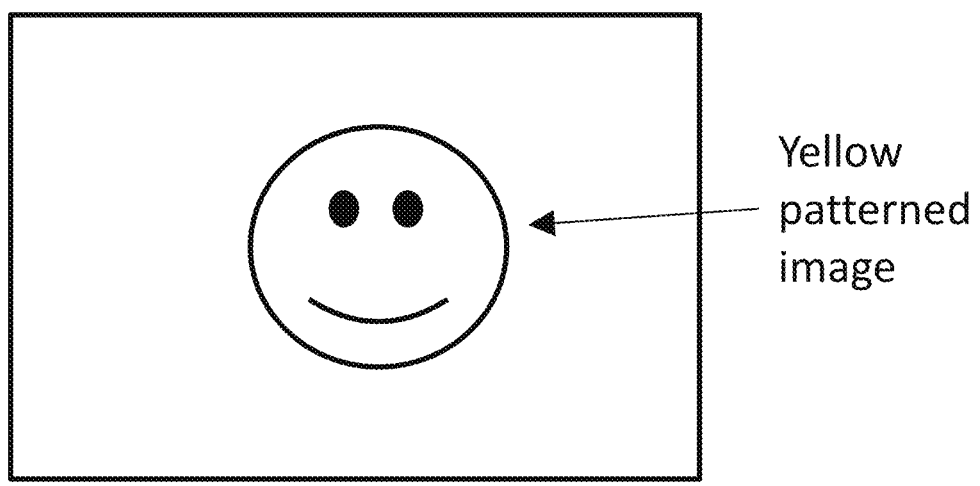
FIG. 7B shows the image resulting from the method shown in FIG. 7A.

In addition to using a projected image, it is also possible to address a display 200 of the invention using an illuminating instrument, such as a light pen or a laser. FIG. 7A shows an embodiment where a pen having a blue LED is used to write an image to a display 200 of the invention. Prior to writing, the display is cleared, as described above with respect to FIGS. 4 and 5, however the polarity of the wipe voltage has been flipped, resulting in an initial state is white. Because the polarity of the electrodes, where the light pen is shined on the display 200, the electro-optic medium 14 will be driven from white toward black, in the blue sub-pixels. Because the blue sub-pixels have been darkened by the change in state in the electro-optic medium 14, the resulting pattern will be the RGB opposite of blue, i.e., yellow, as shown in FIG. 7B. While FIG. 7B is shown with a white background, corresponding to starting with the electro-optic medium 14 in a white state, it is also possible to write such a display in an alternate starting state, i.e., black, however the resulting image will be blue on black. Such displays can be used in place of black boards, i.e., in classrooms, coffee shops, restaurants, etc.

Figure 8:
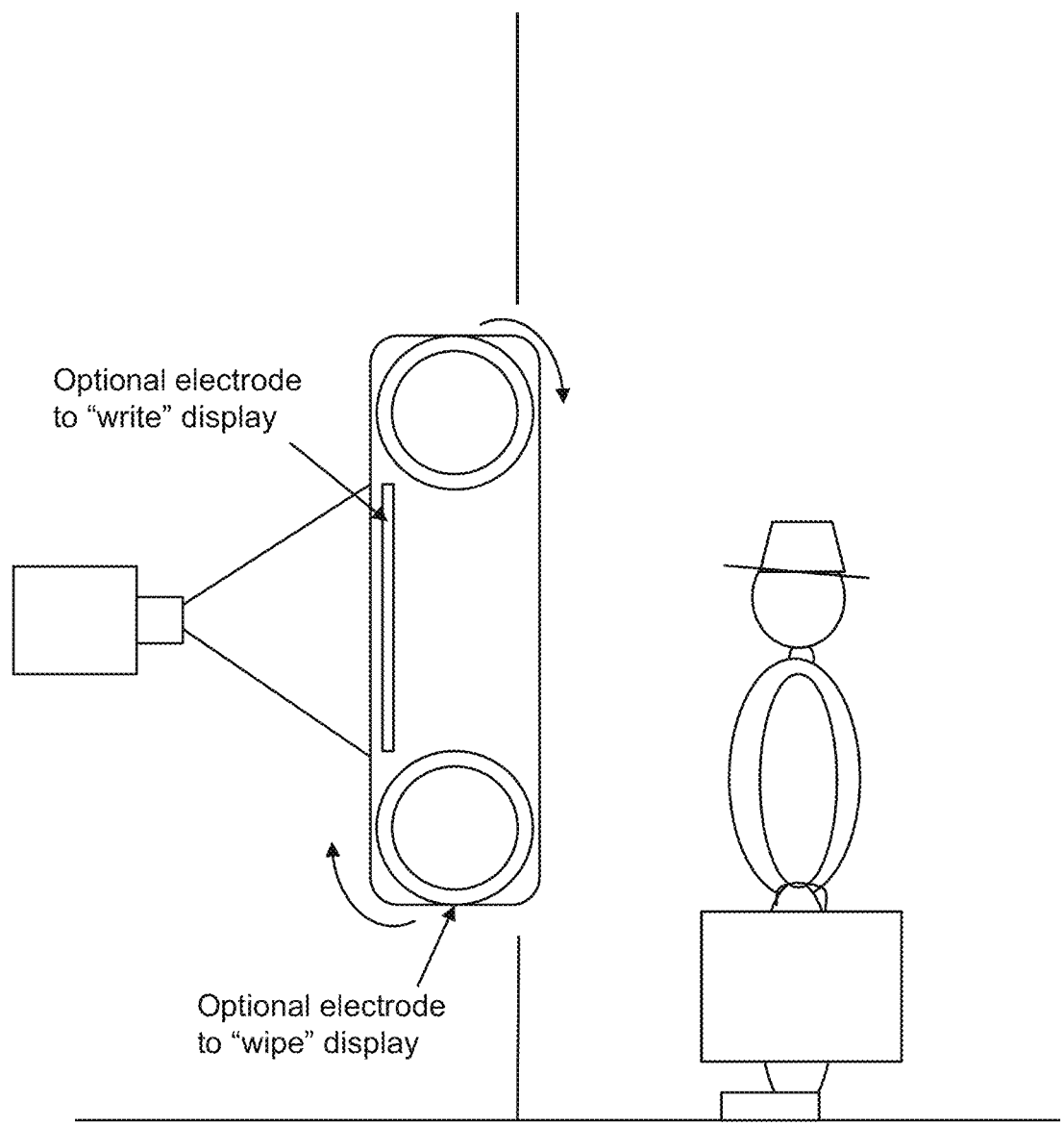
FIG. 8 illustrates the use of a display of the invention for rolling loop signage. Signage of the invention can be used to direct travelers to destinations or events.

Advanced applications of the displays of the invention can be used in other environments where temporary or personalized information is needed in a large format. In the embodiment shown in FIG. 8, a flexible display of the invention is arranged on rollers, allowing the display to be shown on one side of a wall and written on another side of the wall. By carefully controlling the electrical potential between the times of writing and erasing, the same display medium can be used again and again to provide up-to-date and/or varied information in a large format. For example, as shown in FIG. 8 a looped display could be used to provide information to a traveler regarding transportation options from an airport. Unlike conventional LCD displays, however, the looped display shown in FIG. 8 would only have to be updated when needed, e.g., because of schedule changes, and would not require constant power input. Such displays would greatly reduce the amount of energy required to provide up-to-date information. While the looped display of FIG. 8 is shown with separate electrodes to wipe and write the display, the looped display may simply comprise looped material of the type shown in FIG. 2, and be wiped and written as described with respect to FIGS. 3A-5.

The displays 200 of the invention may be part of a display system. For example, the display system may include a display of the type described in FIG. 2 as well as a voltage supply and a controller for regulating how and when an electrical potential is presented to electrodes 110 and 120. The display system may additionally include an illumination source, such as a projector, e.g., a digital LCD projector, and a stand or other equipment to hold the projector in position with respect to the display 200. In other embodiments, the display system may additionally include a camera, allowing a photograph to be taken and the image quickly reproduced in a large format. Such systems may be useful at entertainment venues, such as sporting events and concerts.

Hybrid systems incorporating the principles of the invention are also possible, as illustrated in FIGS. 9A-9C. The display medium in FIGS. 9A-9C, may be used, for example for a billboard in direct sunlight. Unlike the display 200 of FIG. 2, the hybrid display 900 does not include a rear electrode. Rather the electrical potentials needed to wipe and write the display medium are provided by the wipe electrodes 930 and the write electrodes 940. The hybrid display 900 is based upon a layered medium 910 that includes a color filter array 150, a transparent electrode 120, an electro-optic medium 14, and a photoconductive layer 12. Because the write electrode 940 is coupled with an illumination source 950, some portion of the hybrid display 900 can be written with the illumination source 950, as desired. That is, the hybrid display 900 could show an image on the front (FIG. 9C) while the rear (FIG. 9B) of the hybrid display 900 is wiped and re-written. In some embodiments, the hybrid display 900 may incorporate multiple transparent electrodes 120 for ease of addressing the electro-optic medium. In some embodiments the wipe and write electrodes 930 and 940 will move across the layered medium 910. In other embodiments, the layered medium will be scrolled across wipe and write electrodes 930 and 940. Because there is insufficient electrical potential to write the hybrid display 900 on the front side (FIG. 9C), the state of the electro-optic medium will not be altered by the ambient light. In alternative embodiments, the composition of the photoconductive layer 12 may be selected such that the hybrid display 900 can only be written with non-visible light, e.g., UV light. In such embodiments, the hybrid display 900 may also include a filter 960, such as a UV filter, to protect the front of the display from other incident light that may affect the state of the electro-optic medium. Such hybrid displays 900 are thus able to display images, etc., in direct sunlight, yet the content shown on the front of the display can be updated regularly.

While displays of the invention are intended to display images for long periods of time with little to no energy input, the looped displays, described above, can be used to refresh content on the same time scale as emissive displays, e.g., large format LEI displays. Displays of the invention can display two different images in less than one hour, e.g., in less than 10 minutes, e.g., in less than five minutes, e.g., in less than two minutes. Furthermore, the refresh periods can be staggered, depending upon the use of the display. For example, a transportation schedule may be refreshed every five minutes with an advertisement that lasts for 30 seconds, whereupon the transportation schedule is returned for another five minute period.

From the foregoing, it will be seen that the present invention can provide a reusable large-format display medium that requires little energy to maintain an image. Additionally, because the displays of the invention are lightweight and flexible, they can be used in a variety of temporary environments, i.e., they can be disassembled, moved, etc. with ease. In some embodiments, the displays may be simply rolled up like a poster and carted away. Finally, because digital photography and graphic arts are ubiquitous, there is no barrier to using the displays of the invention outside of providing a suitable illumination device coupled to a computer, for example an LCD projector.

It will be apparent to those skilled in the art that numerous changes and modifications can be made in the specific embodiments of the invention described above without departing from the scope of the invention. Accordingly, the whole of the foregoing description is to be interpreted in an illustrative and not in a (imitative sense.

The invention claimed is:

1. A method for updating a reflective image, comprising:
   providing a display including, in this order, from top to bottom:
   a color filter array,
   a transparent electrode,
   an electro-optic medium,
   a photoconductive material, and
   a rear electrode;
   supplying a first electrical potential between the transparent electrode and the rear electrode; and
   exposing the display, through the color filter array, to a source of patterned light while the first electrical potential is supplied, thereby resulting in an updated reflective image being visible from the top of the display when the first electrical potential is not supplied.

2. The method of claim 1, further comprising supplying a second electrical potential to remove the reflective image.

3. The method of claim 1, wherein the source of patterned light comprises a projector.

4. The method of claim 1, wherein the electrical potential is a time-dependent wave form.

5. The method of claim 1, wherein the electro-optic medium comprises an electrophoretic material comprising a plurality of electrically charged particles disposed in a fluid and capable of moving through the fluid under the influence of an electric field.

6. The method of claim 5, wherein the electrically charged particles are white and black.

7. The method of claim 1, wherein the color filter array comprises red, green, and blue elements.

8. The method of claim 7, wherein the red, green, and blue elements are smaller than 1 mm$^2$ in area.

9. The method of claim 7, wherein the red, green, and blue elements are greater than 1 mm$^2$ in area.

10. The method of claim 1, wherein the photoconductive material comprises photoconductive polymers, dye-aggregate photoreceptors, or pigment-based photoconductors.

11. The method of claim 1, wherein the photoconductive material comprises 2,4,7-trinitro-9-fluorine complexed with poly(N-vinylcarbazole).

12. A system for providing a reflective image, comprising:
   a display including, in this order from top to bottom, wherein the reflective image is viewed from the top:

a color filter array,
a transparent electrode,
an electro-optic medium, and
a photoconductive material;
an electrode configured to provide an electrical potential suitable for addressing a portion of the display with light; and
an illumination source configured to illuminate the top of the display, through the color filter array, with light to address the display.

13. The system of claim 12, wherein the illumination source produces light outside of the visible spectrum.

14. The system of claim 12, further comprising a light filter that passes visible light.

15. The system of claim 12, wherein the electro-optic medium comprises an electrophoretic material comprising a plurality of electrically charged particles disposed in a fluid and capable of moving through the fluid under the influence of an electric field.

* * * * *